United States Patent
Wakai et al.

(10) Patent No.: US 6,662,080 B2
(45) Date of Patent: Dec. 9, 2003

(54) ELECTRONIC DATA DISTRIBUTION APPARATUS AND DISTRIBUTION METHOD

(75) Inventors: Yoichi Wakai, Suwa (JP); Satoshi Nebashi, Suwa (JP); Yasuhiro Nomura, Suwa (JP); Yoshiiku Sendai, Suwa (JP); Tetsuo Yamagishi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 145 days.

(21) Appl. No.: 09/983,959

(22) Filed: Oct. 26, 2001

(65) Prior Publication Data
US 2002/0062220 A1 May 23, 2002

(30) Foreign Application Priority Data
Oct. 27, 2000 (JP) ......................................... 2000-329365

(51) Int. Cl.[7] ............................................. G06F 17/00
(52) U.S. Cl. ....................................... 700/234; 700/238
(58) Field of Search ................................ 700/231, 232, 700/234, 235, 238, 244

(56) References Cited
U.S. PATENT DOCUMENTS

| | | | | |
|---|---|---|---|---|
| 4,654,799 A | * | 3/1987 | Ogaki et al. | 700/234 |
| 4,949,257 A | * | 8/1990 | Orbach | 705/21 |
| 5,267,171 A | * | 11/1993 | Suzuki et al. | 700/234 |
| 5,699,328 A | * | 12/1997 | Ishizaki et al. | 369/24.01 |
| 5,845,262 A | * | 12/1998 | Nozue et al. | 705/26 |
| 5,884,140 A | * | 3/1999 | Ishizaki et al. | 455/2.01 |
| 6,021,390 A | * | 2/2000 | Satoh et al. | 705/1 |
| 6,295,482 B1 | * | 9/2001 | Tognazzini | 700/233 |
| 6,330,490 B1 | * | 12/2001 | Kim et al. | 700/234 |
| 6,535,791 B1 | * | 3/2003 | Wang | 700/235 |

* cited by examiner

*Primary Examiner*—Khoi H. Tran
(74) *Attorney, Agent, or Firm*—Oliff & Berridge, PLC

(57) ABSTRACT

An information medium collecting unit receives and collects information media to be recycled. An inspection unit inspects the information media collected at the information medium collecting unit. An electronic-data recording unit transfers and records electronic data stored in a storage unit onto the information media that are determined to be recyclable as a result of the inspection. A product holding unit holds the information media on which the electronic data is recorded. A product discharging unit discharges the information media held in the product holding unit, in accordance with a distribution request. Since the information media collected at a vending machine are processed inside of the vending machine for recycling and are turned into products inside of the vending machine for direct sale, information media to be discarded are reduced and thus cost to customers to obtain information can be reduced.

10 Claims, 4 Drawing Sheets

(a)

(b)

ELECTRONIC DATA DISTRIBUTION APPARATUS AND DISTRIBUTION METHOD

BACKGROUND OF THE INVENTION

1. Field of Invention

The present invention relates to an electronic-data distribution apparatus and a distribution method which are suitable to collect and distribute information media on which electronic data is recorded.

2. Description of Related Art

With the advancements in computerization of documents and dictionaries, information media, such as CD-ROMs, MOs, DVDs, and memory cards, are widely used for distributing dictionaries, magazines, newspapers, music, and the like. These media are sold at mass retailers, such as bookstores, personal computer shops, or musical instrument shops, and thus are readily available. As the use of the Internet expands, systems that allow access to electronic data through networks are also becoming more numerous. In either case, handling a great amount of information, such as carrying, exchanging, or appending such information in a paperless manner, is becoming easier. It is thus expected that the use of electronic data will become increasingly popular.

However, the related art as described above has the following problems that need to be addressed. Once an information medium on which electronic data has been recorded is purchased, the electronic data is displayed by reading the information medium with a computer or the like. After the electronic data of a newspaper or magazine that is recorded on the information medium is read, the information medium becomes unnecessary.

For example, for floppy disks or CD-ROMs, unnecessary information media are discarded due to their low cost. However, where the environmental issues are considered, recycling of all products should be considered.

For information media, such as floppy disks, CD-Rs, or MOs, since data on the information media can be erased and rewritten, it is possible to only sell the electronic data that uses a terminal apparatus for writing such electronic data. This can decrease the quantity of information media to be discarded. However, it takes some time to write the electronic data onto the information media. Consequently, such an arrangement is not suitable for selling information, including newspapers or the like, that customers need to purchase readily and quickly. Where newspaper or magazine information is sold in an electronic data format, a large quantity of information media is transported to retail stores, which can also result in the problem of collecting the used information media in the same manner as in the related art sales of the newspapers.

On the other hand, if the data is directly transmitted to computers or other electronic data display devices over a network, such as the Internet, the need for the information media is eliminated, thus overcoming the issue of discarding the information media. However, this procedure requires time for downloading the electronic data and entails a cost for the communication. Moreover, customers cannot obtain such data as required.

SUMMARY OF THE INVENTION

The present invention includes the following arrangement to address the aforementioned points.

<Configuration 1>

One configuration of the invention provides an electronic-data distribution apparatus that includes: an information-medium collecting unit that receives and collects an information medium to be recycled; and an inspection unit that inspects the information medium collected by the information-medium collecting unit. The apparatus further includes: an electronic-data recording unit that transfers and records electronic data stored in a storage unit onto the information medium determined to be recyclable as a result of the inspection; a product holding unit that holds the information medium on which the electronic data is recorded; and a product discharging unit that discharges the information medium held in the product holding unit, in accordance with a distribution request.

The information-medium collecting unit receives information media. The inspection unit determines whether the information medium is recyclable or not. Electronic data that is stored in the storage unit is data to be newly recorded onto the information medium and to be distributed. Any method may be used to record the electronic data. The product holding unit holds the information media to be distributed. The information media may be distributed for a fee or free of charge. The information media are retrieved from the product holding unit according to the number requested in response to the distribution request and be discharged. In this manner, the information media are collected and are recycled by directly writing the electronic data, so that the information media can be distributed. Since the customers provide distribution requests for the information media on which electronic data has already been recorded, they can receive the information media on which the electronic data has been recorded without waiting for the electronic data to be written onto the information media.

<Configuration 2>

In an electronic-data distribution apparatus according to another configuration, the apparatus further includes a defective-item holding unit that holds an information medium that is determined to be non-recyclable as a result of the inspection by the inspection unit.

Where a defective information medium is collected, the information medium is separated into the defective-item holding unit for separate disposal.

<Configuration 3>

In an electronic-data distribution apparatus according to another configuration, the apparatus further includes an electronic data receiving and processing unit that receives electronic data to be recorded onto the information medium through a network, and that stores the electronic data in a storage device.

In this system, the electronic data is transmitted through the network to a number of electronic-data distribution apparatuses installed in retail stores and the like, the respective apparatuses record the electronic data onto the recycled information media and distribute the resulting information media. This can reduce the transportation costs of the information media and can speed up the electronic data distribution system.

<Configuration 4>

In an electronic-data distribution apparatus according to another configuration, the electronic-data recording unit operates where the overall processing load of the apparatus is equal to or below a predetermined value.

The processing to record the electronic data onto the information medium places a load on the control unit. Without collecting the information media, if the information media are held in the product holding unit, the information media can be distributed. Thus, electronic data writing onto information media to be recycled is performed where the load is light, that is, where the product discharging unit or the like are not operating.

<Configuration 5>

In an electronic-data distribution apparatus according to another configuration, the apparatus further includes an automatic payment-processing unit that executes payment transactions for the information medium on which the electronic data is recorded. The product discharging unit discharges the information medium that is held in the product holding unit after the automatic payment-processing unit has completed the payment transactions.

The apparatus is provided with the automatic payment-processing unit to operate as a vending machine for the information media. This automatic payment-processing unit may receive cash and verify the cash, or may read a cash card and perform payment transactions automatically. This configuration allows the customers to readily obtain the information media on which necessary electronic data is recorded, in exchange for payment.

<Configuration 6>

In an electronic-data distribution apparatus according to another configuration, the automatic payment-processing unit executes discount processing for the payment for the information medium where the information medium is determined to be recyclable as a result of the inspection by the inspection unit.

It is effective to use the system that receives the information media in exchange for payment, in order to receive customer's cooperation for recycling. Where selling the information media on which the electronic data is recorded, the apparatus provides a discount on the electronic data in a case in which the information medium is collected. The processing of the discount may make a deduction from the sales price of the information medium, or record the discount into, for example, a point card for a discount service.

<Configuration 7>

In an electronic-data distribution apparatus according to another configuration, the information-medium collecting unit reads the electronic data recorded on the information medium to be recycled, and determines a discounted price depending on the content of the electronic data recorded on the collected information medium. The automatic payment-processing unit executes discount processing for the payment for the information medium in accordance with the discounted price.

The apparatus of this example determines the so-called "trade-in price". Where a customer who wishes for upgrading or the like deposits an information medium, the content thereof is compared with the content of electronic data to be sold so that a reasonable trade-in price can be determined.

<Configuration 8>

Another configuration of the invention provides an electronic data distribution method. The method includes the steps of: receiving and collecting an information medium to be recycled into a vending machine for information media; inspecting the collected information medium inside of the vending machine and recording electronic data onto the information medium determined to be recyclable as a result of the inspection inside the vending machine; and distributing the information medium on which the electronic data is recorded.

Since collection, regeneration, and distribution of information medium is performed inside of the vending machine, the amount of refilling can be reduced.

<Configuration 9>

In an electronic data distribution method according to another configuration, where the collected information medium is determined to be recyclable as a result of the inspection, discount processing for the information medium to be distributed is executed.

<Configuration 10>

In an electronic data distribution method according to configuration, a discounted price is determined depending on the content of electronic data recorded on the information medium to be distributed. The discount processing for the payment for the information medium is executed in accordance with the discounted price.

DETAILED DESCRIPTION OF PREFERRED EMBODIMENTS

An embodiment of the present invention will now be described in conjunction with specific examples.

Figure 1:
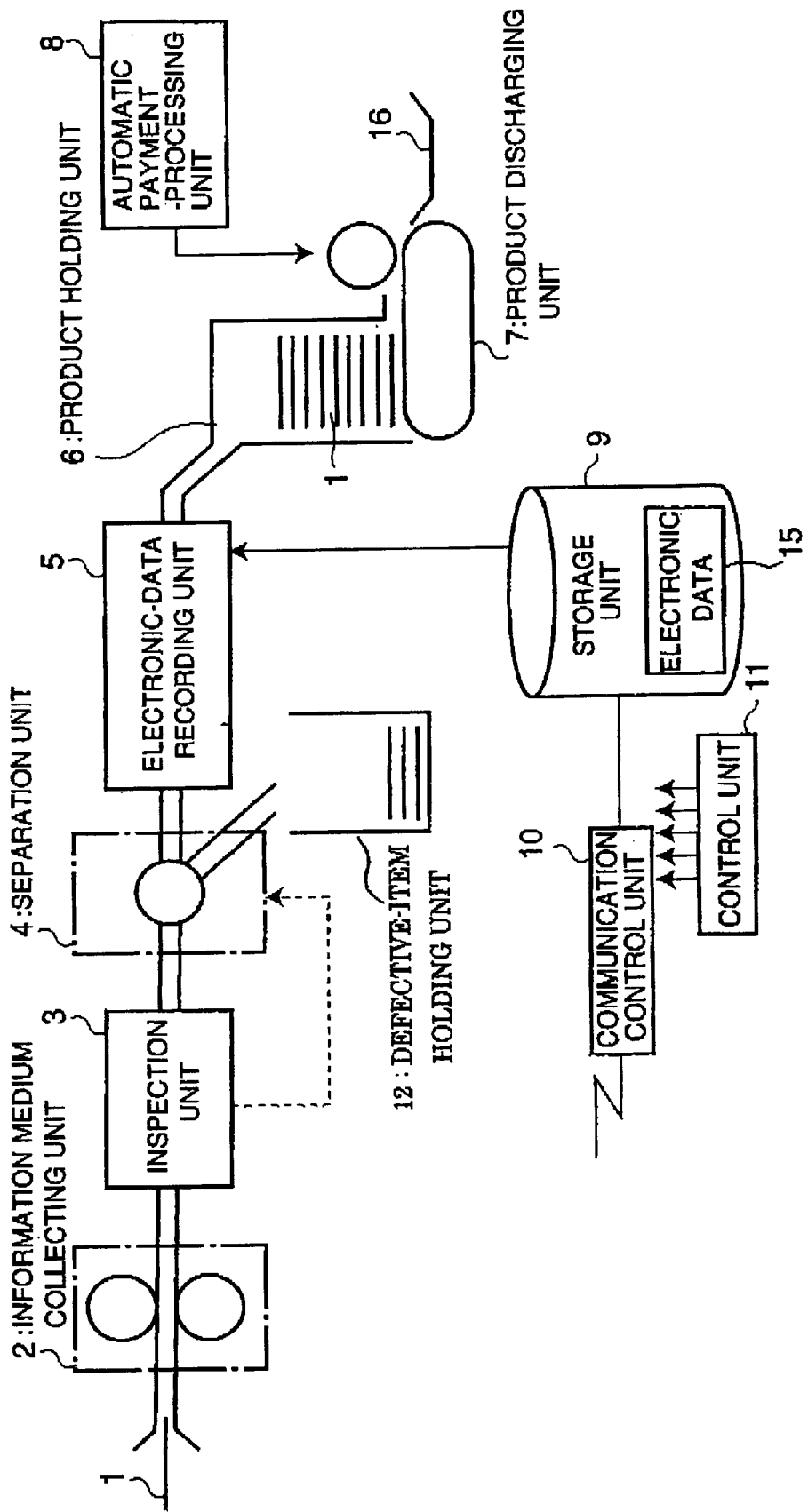
FIG. 1 is a schematic showing a specific example of an electronic-data distribution apparatus of the present invention.

FIG. 1 is a schematic showing a specific example of an electronic-data distribution apparatus of the present invention. The apparatus shown in FIG. 1 collects and distributes information media 1. This apparatus includes an information medium collecting unit 2, an inspection unit 3, a separation unit 4, an electronic-data recording unit 5, a product holding unit 6, a product discharging unit 7, an automatic payment-processing unit 8, a storage unit 9, a communication control unit 10, a control unit 11, and a defective-item holding unit 12.

The information medium collecting unit 2 receives and collects the information media 1 to be recycled. The information medium collecting unit 2 is constructed of a guide that receives the information medium 1, a conveying mechanism, and the like. If the information media 1 are floppy disks or the like, the conveying mechanism may use a well-known cash card reader or the like. The inspection unit 3 checks the information media 1 collected by the information medium collecting unit 2. If the information media 1 are floppy disks or the like, the inspection unit 3 checks whether they can be successfully formatted or not.

The separation unit 4 has a function of switching the conveying direction of the information media 1 in accordance with the result of the inspection performed by the inspection unit 3. Where an information medium 1 is determined to be non-recyclable, the separation unit 4 selects the conveying direction such that the information medium is held in the defective-item holding unit 12. The information medium 1 held in the defective-item holding unit 12 is thus separated from other information media and is then discarded. Where the result of the inspection shows that the information medium 1 can be recycled, the separation unit 4 selects the conveying direction such that the information medium 1 is conveyed to the electronic-data recording unit 5.

The electronic-data recording unit 5 transfers and records electronic data stored in the storage unit 9 onto the information media 1 that have been determined to be recyclable as the result of the inspection. If the information media 1 are floppy disks, the electronic-data recording unit 5 is constructed of a well-known floppy disk drive. The storage unit 9 stores the latest version of electronic data 15 that has been transferred through the network 13 and the communication control unit 10. Thus, the apparatus records the latest version of electronic data onto the collected information media 1 and creates information media 1 to be turned into products for distribution. The product holding unit 6 is a stocker that accommodates and holds the information media 1. The product discharging unit 7 conveys information media 1 piece by piece, which are stacked, for example, as shown in FIG. 1, toward the right side in the figure and of discharging the information media 1 onto a tray 16. For example, after the automatic payment-processing unit 8 recognizes that a customer has deposited cash and then, upon the input of a request to discharge one of the information media 1, the product discharging unit 7 responds to the request and performs an operation.

Where the customer deposits cash, the automatic payment-processing unit 8 checks the cash to determine the authenticity thereof, and calculates and dispenses change. A cash handling device, which is employed in a known vending machine, is suitable for the automatic payment-processing unit 8. Where the customer deposits necessary payment, the automatic payment-processing unit 8 operates such that it requests the product discharging unit 7 to discharge a number of information media according to the payment. If the apparatus is configured for cash-less specification, the payment transaction may be automatically performed by reading a cash card and performing predetermined communication with the on-line system of a bank. Alternatively, the payment transaction may be made through the use of a credit card.

In this example, the information medium has been distributed for a fee, but it may be distributed free of charge. For example, the apparatus can also be utilized to distribute electronic data compiled from information in bulletins, town newspapers, advertising publicity, and the like which may be distributed at no charge. In this case, for example, the product discharging unit 7 may be configured such that, in response to a distribution request by pushing a button, it retrieves and discharges the information media according to the number requested. The control unit 11 controls cooperative operations between respective units of this apparatus.

Figure 2:
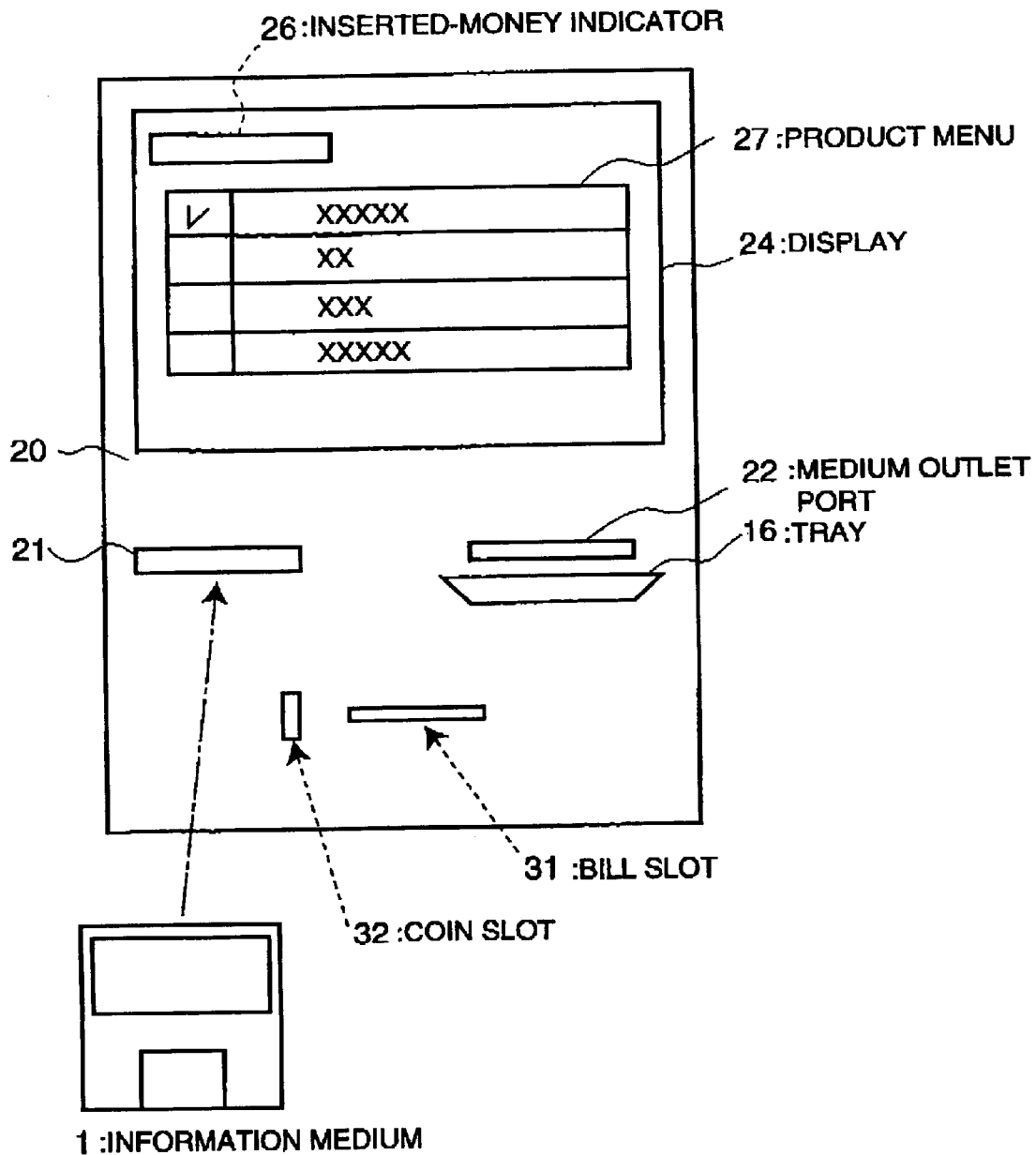
FIG. 2 is a schematic front view showing the exterior of the electronic-data distribution apparatus of the present invention.

FIG. 2 is a schematic front view of the exterior of the electronic-data distribution apparatus of the present invention.

As shown in FIG. 2, the electronic-data distribution apparatus 20 includes a medium inlet port 21 into which a customer deposits an unwanted information medium 1, a medium outlet port 22 which discharges an information medium purchased by a customer, and a tray 16. The medium inlet port 21 is arranged at the entrance of the information-medium collecting unit 2 shown in FIG. 1. The apparatus is also provided with a display 24 to display instructions to the customer.

This display 24 displays, for example, an inserted-money indicator 26 for cash deposited by the customer and a product menu 27 showing the content of the electronic data sold by the apparatus. For example, two or more sets of the electronic-data recording units 5, the product holding units 6, and the product discharging units 7 can be provided to sell, at a single electronic-data distribution apparatus 20, information media on which different types of electronic data have been respectively recorded. The electronic-data distribution apparatus 20 includes at the center thereof a bill slot 31 and a coin slot 32 for the customer to deposit payment for the information medium.

Figure 3:
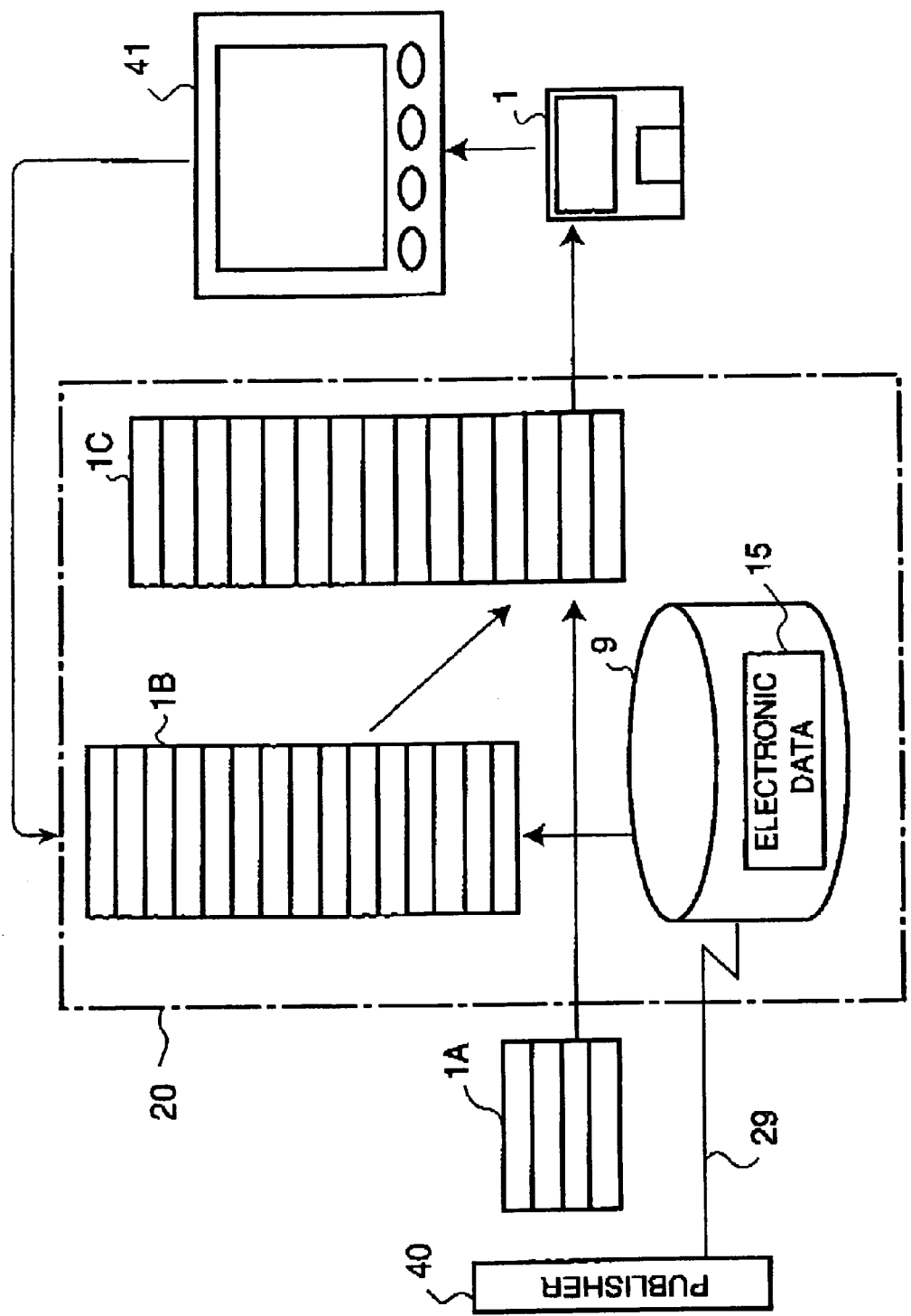
FIG. 3 is a schematic showing the flow of the information media and electronic data in a system that utilizes the apparatus of the present invention.

FIG. 3 is a schematic illustrating the flow of the information media and electronic data of the system which are utilized in the apparatus of the present invention.

As shown in FIG. 3, a publisher 40 and the electronic-data distribution apparatus 20 are connected through a network 29. The electronic data 15 is transferred to the electronic-data distribution apparatus 20 through the network 29. The electronic data 15 is stored in the storage unit 9 of the electronic-data distribution apparatus 20. The electronic data 15 may include various types of data, such as timetables and travel guidebooks, as well as newspaper and magazine data. For example, if it is newspaper data, the electronic data 15 stored in the storage unit 9 is rewritten not only in the morning and evening, but each time a new edition is issued. For example, the customer loads the information medium 1 into a portable display device 41, as shown in FIG. 3, to read the newspaper or magazine in the electronic-data format.

The customer can obtain the information medium 1, on which the latest electronic data 15 is recorded, from the electronic-data distribution apparatus 20, as needed. If, then, the customer has an information medium whose content has become old, the customer deposits it in the electronic-data distribution apparatus 20 and goes home. The latest electronic data 15 is then recorded onto the information medium by the electronic-data distribution apparatus 20, and the information medium is held in the product holding unit 6 shown in FIG. 1. Reference numeral 1B in FIG. 3 represents information media that are not needed by customers and that are to be recycled, and reference numeral 1C in FIG. 3 is information media to be sold to customers.

Meanwhile, since there is only a risk of a shortage of information media with the recycled media, new information media 1A are supplied as required. It is not necessary for electronic data to be recorded on the information media in advance. This is because an electronic data recording capability is provided in the electronic-data distribution apparatus. Thus, information media IC in FIG. 3 is either the new information media 1A onto which the electronic data 15 has been recorded, or the recycled information media 1B onto which the electronic data 15 has been recorded.

In this manner, since the customer purchases the information media on which the electronic data has already been recorded, there is no need for the customer to wait until the electronic data is recorded onto the information media. Since information media brought in by customers are always recycled unless they are defective, it is possible to prevent a large amount of the information media from being dumped. Moreover, since the apparatus utilizes the information media brought in by customers to output products, it is possible to handle a certain degree of demand without refilling new information media. Thus, this system may be provided such that the publisher transmits the latest version of electronic data to the apparatus and the manager of the electronic-data distribution apparatus 20 refills the portions of the discharged information media. This can significantly reduce the overall maintenance and management cost of the system. The information media for refilling may be ones that are available on the market.

In addition, since there is no need for electronic data to be recorded in newly refilled information media in advance, the information media for refilling do not have to be sent all the way from the publisher. Thus, information media on the market can be directly supplied into the information-medium collecting unit 2 (FIG. 1), so that the managers of retail stores where the electronic-data distribution apparatus 20 are installed may refill the information media on their own. This can provide optimal operation for apparatuses installed at multiple retail stores on the street.

Figure 4:
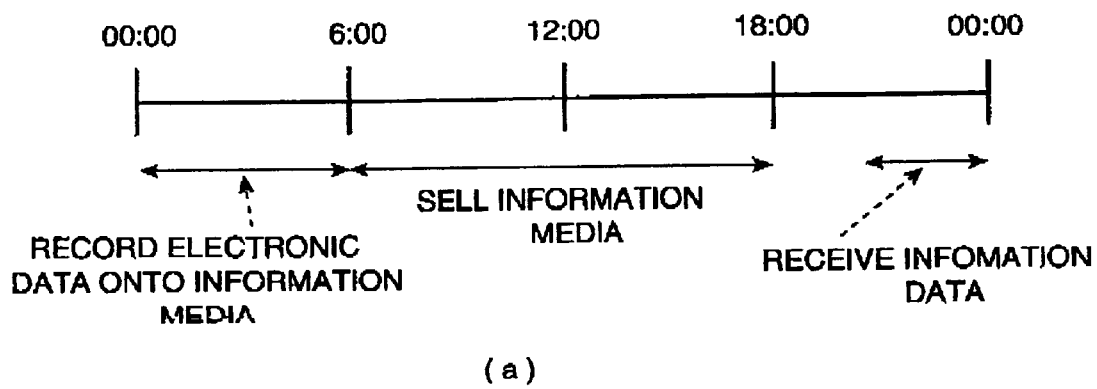
FIGS. 4(a) and 4(b) are schematics that each show different operation modes.
Figure 4:
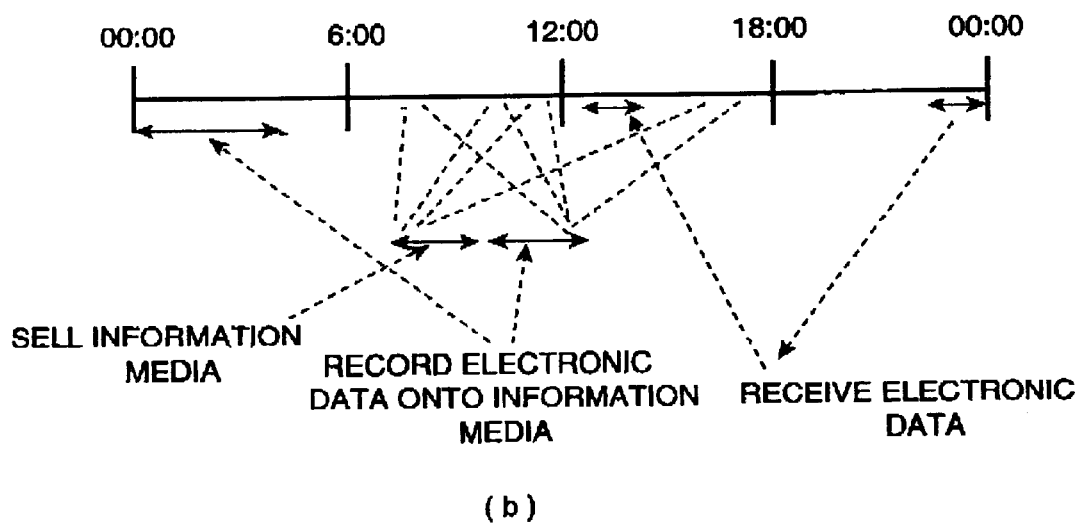

FIGS. 4(a) and 4(b) are schematics that each show different operation modes of the apparatus. Because the electronic-data distribution apparatus of the present invention not only distributes the information media, but also writes electronic data onto the collected information media, a large load is placed on the control unit 11 (FIG. 1). It is therefore preferable to control the control unit 11 with a time schedule as shown in FIGS. 4(a) and 4(b). FIGS. 4(a) and 4(b) are time charts that each show an example of the 24-hour operation of the electronic-data distribution apparatus.

FIG. 4(a) shows an operation mode to process electronic data of weekly journals or magazines which are updated about once every several days. The electronic-data distribution apparatus is devoted to making sales in the daytime when customers frequently purchase the information media. That is, in the daytime, only the product discharging unit 7 and the automatic payment-processing unit 8 operate. At night, the electronic-data distribution apparatus controls the communication control unit 10 (FIG. 1) to process the reception of the electronic data 15. Thereafter, the electronic-data distribution apparatus writes the electronic data onto the information media and holds the information media in the product holding unit 6 (FIG. 1). The information media which have been already held in the product holding unit 6 and which have old versions of electronic data recorded thereon may be returned to the electronic-data recording unit 5, such that new electronic data is recorded onto the information media. To reserve the information media, which have been collected in such a manner, until night, a reserving unit that stocks the information media is preferably provided immediately before the electronic-data recording unit 5 of the apparatus shown in FIG. 1.

FIG. 4(b) shows an operation mode of the electronic-data distribution apparatus for newspapers or the like in which versions may vary many times in a day. In this case, where a customer is not operating the apparatus for purchasing, the apparatus always processes electronic data writing onto the collected, new information media. Thus, as soon as the customer purchases the information medium at the apparatus as shown in FIG. 1, the apparatus may write electronic data onto the information medium deposited by the customer. This is achieved in such a manner that the control unit 11 (FIG. 1) monitors the load on the apparatus, and the electronic data is written onto the information medium where the entire processing load of the apparatus is equal to or below a predetermined value.

Discount processing will now be described.

If the information media are collected for a payment, a customer's positive cooperation to recycle can be obtained. In this case, a method in which a payment is provided upon the collection of the information media may be employed. However, it is unreasonable to effect payment to a customer who has deposited a non-recyclable information medium. In addition, if the apparatus is in the form of a vending machine, it is necessary to simplify the use. Thus, in a first example, a collected information medium is inspected at the inspection unit 3, and where the result of the inspection shows that it is recyclable, then the discount processing is executed for an information medium to be distributed.

Referring to FIG. 1, where a customer deposits the information medium 1 in the information medium collecting unit 2 and deposits cash in the automatic payment-processing unit 8, the inspection unit 3 determines whether the information medium is good or bad. Where the information medium is determined to be recyclable, the apparatus operates to process a certain amount of price discount, which can return the discounted amount to the customer with great ease.

A second method is to compare the value of information to be provided to the customer with the value of information recorded on an information medium deposited by the customer, and to thereby collect payment equivalent to the difference. In this case, the inspection unit 3 shown in FIG. 1 reads the content and version of electronic data that is recorded on the information medium 1 deposited by the customer. Where the inspection unit 3 determines that the customer is using the apparatus to upgrade the version of the electronic data, then it determines a discounted price depending on the content thereof. By enabling such methods, customers can readily obtain the latest electronic data at low cost.

The aforementioned apparatus of the present invention has the following advantages:

1. Since all electronic data required by customers are recorded on the information medium in advance, and then the information media are directly provided to the customers, the users can obtain the electronic data quickly.

2. Since information media brought in by users are utilized, i.e., collected, regenerated, and recycled, a large amount of waste does not occur.

3. Since information media collected at the vending machine are regenerated and turned into products inside the vending machine for direct sale, it is possible to reduce the amount of refilling of the information media, mailing costs and information media costs, and thus the cost for customers to obtain information is lowered.

4. The information media collected can be inspected and turned into products inside of the vending machine body.

What is claimed is:

1. An electronic-data distribution apparatus, comprising:
   an information medium collecting unit that receives and collects an information medium to be recycled;
   an inspection unit that inspects the information medium collected by said information-medium collecting unit;
   an electronic-data recording unit that transfers and records electronic data stored in a storage unit onto the information medium determined to be recyclable as a result of the inspection;
   a product holding unit that holds the information medium on which the electronic data is recorded; and
   a product discharging unit that discharges a pre-recorded information medium held in said product holding unit, in accordance with a distribution request, the pre-recorded information medium being different than the information medium.

2. An electronic-data distribution apparatus, comprising:
   an information medium collecting unit that receives and collects an information medium to be recycled;
   an inspection unit that inspects the information medium collected by said information-medium collecting unit;
   an electronic-data recording unit that transfers and records electronic data stored in a storage unit onto the information medium determined to be recyclable as a result of the inspection;
   a product holding unit that holds the information medium on which the electronic data is recorded;
   a product discharging unit that discharges the information medium held in said product holding unit in accordance with a distribution request; and a defective-item holding unit that holds an information medium determined to be non-recyclable as a result of the inspection by said inspection unit.

3. An electronic-data distribution apparatus according to claim 1, further comprising:

an electronic data receiving and processing unit that receives electronic data to be recorded onto the information medium through a network, and that stores the electronic data in a storage device.

4. An electronic-data distribution apparatus according to claim 1, said electronic-data recording unit operating where the overall processing load of the apparatus is equal to or below a predetermined value.

5. The electronic-data distribution apparatus according to claim 1, further comprising:

an automatic payment-processing unit that executes payment transactions for the information medium on which the electronic data is recorded, said product discharging unit discharging the information medium held in the product holding unit after said automatic payment-processing unit completes the payment transactions.

6. An electronic-data distribution apparatus, comprising:

an information medium collecting unit that receives and collects an information medium to be recycled;

an inspection unit that inspects the information medium collected by said information-medium collecting unit;

an electronic-data recording unit that transfers and records electronic data stored in a storage unit onto the information medium determined to be recyclable as a result of the inspection;

a product holding unit that holds the information medium on which the electronic data is recorded;

a product discharging unit that discharges the information medium held in said product holding unit, in accordance with a distribution request;

an automatic payment-processing unit that executes payment transactions for the information medium on which the electronic data is recorded, said product discharging unit discharging the information medium held in the product holding unit after said automatic payment-processing unit completes the payment transactions; and said automatic payment-processing unit executing discount processing for crediting payment for the information medium where the information medium is determined to be recyclable as a result of the inspection by said inspection unit.

7. An electronic-data distribution apparatus, comprising:

an information medium collecting unit that receives and collects an information medium to be recycled;

an inspection unit that inspects the information medium collected by said information-medium collecting unit;

an electronic-data recording unit that transfers and records electronic data stored in a storage unit onto the information medium determined to be recyclable as a result of the inspection;

a product holding unit that holds the information medium on which the electronic data is recorded;

a product discharging unit that discharges the information medium held in said product holding unit, in accordance with a distribution request;

an automatic payment-processing unit for executing that executes payment transactions for the information medium on which the electronic data is recorded, wherein said product discharging unit discharges discharging the information medium held in the product holding unit after said automatic payment-processing unit completes the payment transactions;

said information-medium collecting unit reading the electronic data recorded on the information medium to be recycled, and determining a discounted price depending on the content of the electronic data recorded on the collected information medium, and said automatic payment-processing unit executing discount processing for crediting payment for the information medium in accordance with the discounted price.

8. An electronic data distribution method, comprising:

receiving and collecting an information medium to be recycled into a vending machine for information media;

inspecting the collected information medium inside of the vending machine;

recording electronic data onto the information medium determined to be recyclable as a result of the inspection inside of the vending machine; and distributing a pre-recorded information medium on which electronic data is recorded, the pre-recorded information medium being different than the information medium.

9. An electronic data distribution method, comprising:

receiving and collecting an information medium to be recycled into a vending machine for information media;

inspecting the collected information medium inside of the vending machine;

recording electronic data onto the information medium determined to be recyclable as a result of the inspection inside of the vending machine;

distributing the information medium on which the electronic data is recorded and where the collected information medium is determined to be recyclable as a result of the inspection, discount processing is credited for the information medium to be distributed.

10. An electronic data distribution method, comprising:

receiving and collecting an information medium to be recycled into a vending machine for information media;

inspecting the collected information medium inside of the vending machine;

recording electronic data onto the information medium determined to be recyclable as a result of the inspection inside of the vending machine;

distributing the information medium on which the electronic data is recorded;

determining a discounted price depending on the content of electronic data recorded on the information medium to be recyclable, and executing the discount processing for crediting payment for the information medium in accordance with the discounted price.

* * * * *